J. K. STALLINGS.
BOLL WEEVIL EXTERMINATOR.
APPLICATION FILED SEPT. 16, 1916.

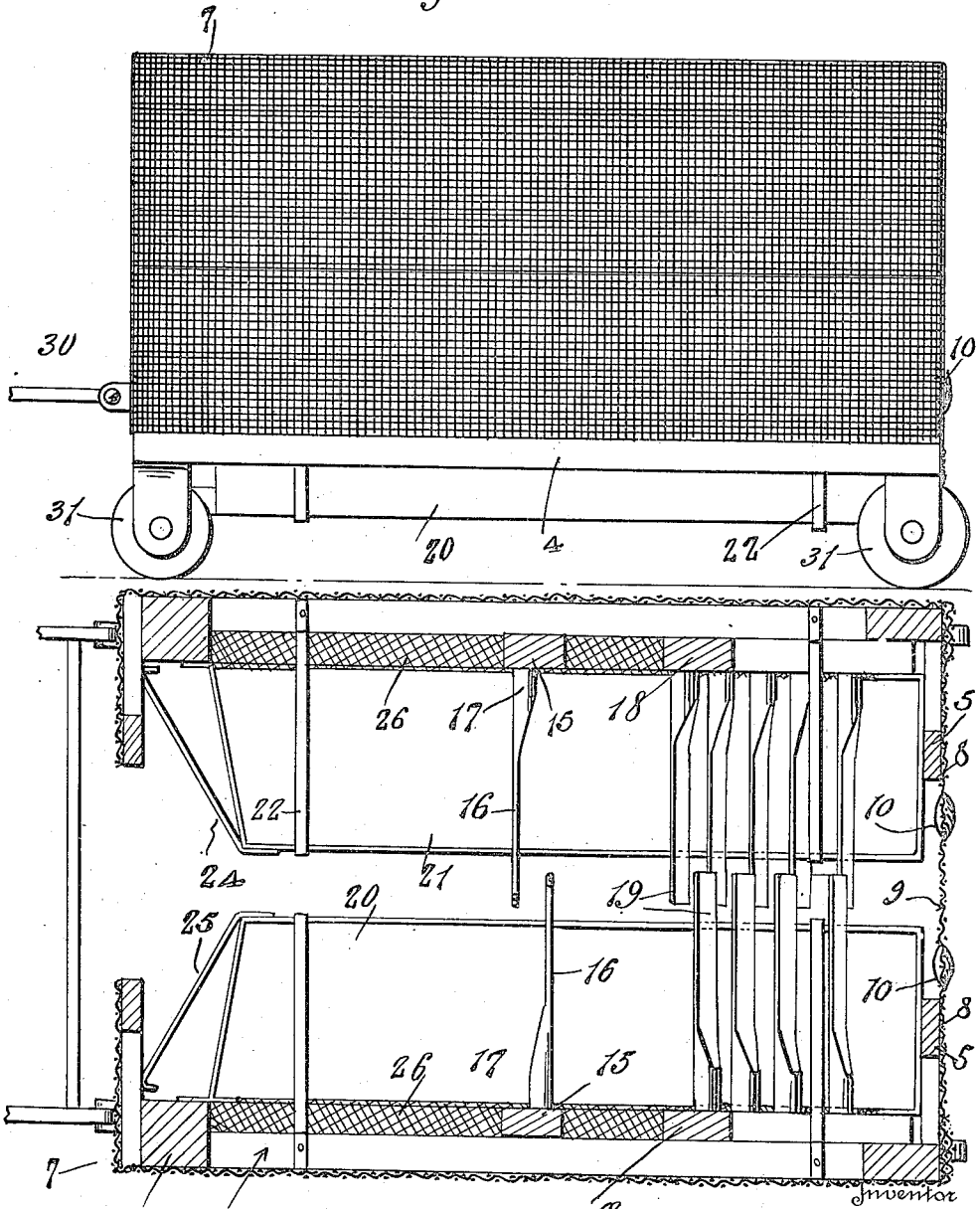

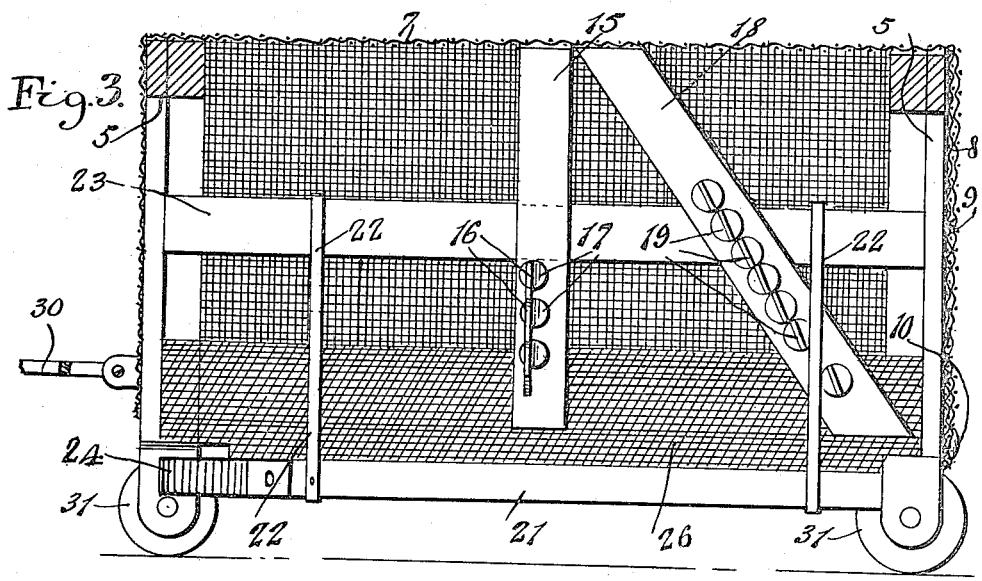
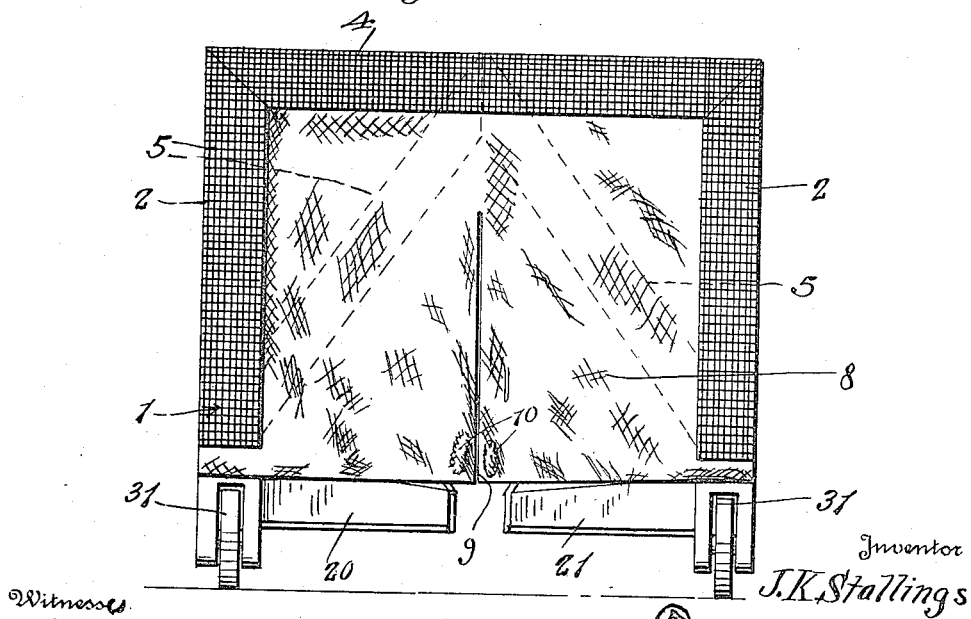

1,216,006.

Patented Feb. 13, 1917.
3 SHEETS—SHEET 3.

Witnesses
Inventor
J. K. Stallings.

UNITED STATES PATENT OFFICE.

JAMES K. STALLINGS, OF PIGEON CREEK, ALABAMA.

BOLL-WEEVIL EXTERMINATOR.

1,216,006.   Specification of Letters Patent.   Patented Feb. 13, 1917.

Application filed September 16, 1916. Serial No. 120,474.

*To all whom it may concern:*

Be it known that I, JAMES K. STALLINGS, a citizen of the United States, residing at Pigeon Creek, in the county of Crenshaw and State of Alabama, have invented certain new and useful Improvements in Boll-Weevil Exterminators; and I do hereby declare the following to be a full, clear, and exact description of the invention, such as will enable others skilled in the art to which it appertains to make and use the same.

This invention relates to a device for exterminating boll weevils, and the primary object of the invention is to provide a portable structure, which includes a supporting frame covered with screen, which frame is adapted for traveling over the growing cotton plants, and further to provide a plurality of resilient arms which extend inwardly to the center of the interior of the frame, from its sides, and are adapted for engagement with a cotton plant for shaking the weevils therefrom into suitable troughs, which retain any desired type of liquid which will kill the boll weevils.

Another object of this invention is to provide a canvas covering for the back or rear end of the device which is provided with a slit to permit the cotton plants to pass therethrough, and which covering is weighted, so that it will strike the outermost ends of the branches of a plant and facilitate the shaking of the insects therefrom.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved boll weevil exterminating machine.

Fig. 2 is a horizontal section through the machine.

Fig. 3 is a vertical section through the machine.

Fig. 4 is a rear end view of the machine.

Figure 5:
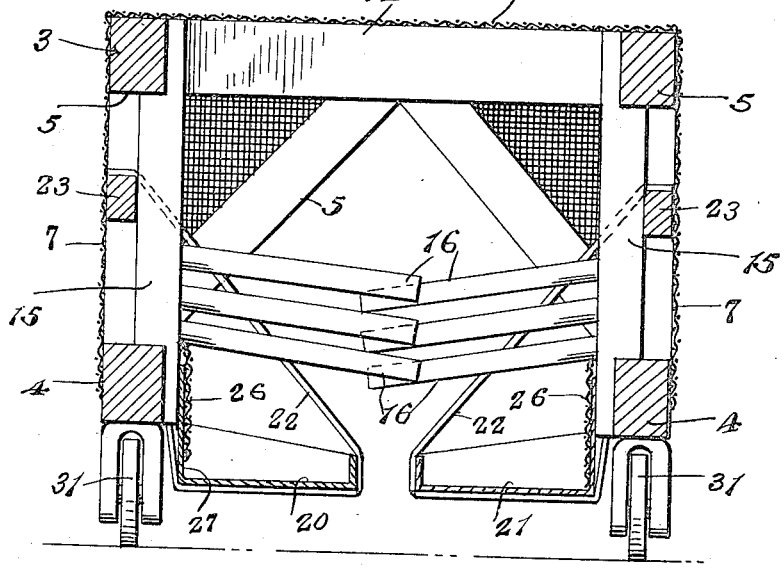
Fig. 5 is a vertical cross section through the machine.
Figure 6:
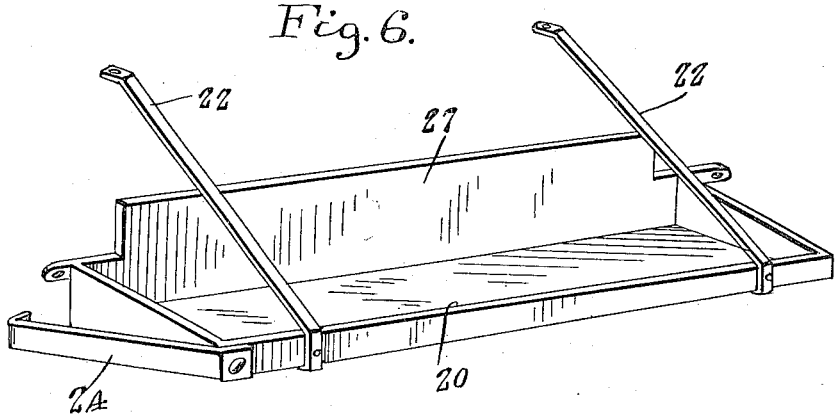
Fig. 6 is a detail perspective view of one of the liquid retaining pan structures.

Referring more particularly to the drawings, 1 designates the supporting frame of the machine, as an entirety, which frame includes vertical standards 2, and an upper rectangular frame 3 and a lower rectangular frame 4. The frames 3 and 4 include side rails 5 and the upper frame 3 includes end rails 4. Suitable angular braces 5 are provided for bracing the end rails 4 of the upper rectangular frame 3.

The sides, top and front ends of the supporting frame 1 are covered with screens as indicated at 6 and 7, and the rear end of the machine has a canvas covering 8 attached thereto which is provided with a slit 9. Weights 10 are attached to the lower end of the canvas covering 8 and they are provided for holding the canvas covering in its proper position, and for engaging cotton plants and shaking them.

A pair of vertical bars 15 are carried by the opposite sides of the supporting structure substantially equidistant of its end and they have a plurality of resilient knocker arms 16 attached thereto, which arms are provided for engaging cotton plants and shaking them for knocking insects such as boll weevils or the like therefrom. The resilient knocker arms or bars 16 have their inner ends 17 enlarged, and seated in suitable openings formed in the bars 15. The knocker bars 16 carried by one side of the supporting frame are positioned slightly in advance of the knocker bars carried by the opposite side of the frame, as clearly shown in Fig. 2 of the drawings. The inner ends of the knocker arms overlap so as to insure proper engagement with a cotton plant.

A pair of angle bars 18 are supported upon each side of the supporting structure 1 rearwardly of the vertical bars 15 and they have a plurality of knocker arms 19 attached thereto, which knocker arms are identical in construction to the knocker arm 16, and are disposed angularly with respect to the knocker arm 16, as clearly shown in Fig. 3 of the drawings. The knocker arms 16 and 19 are provided for engaging cotton plants, when the boll weevil exterminator is driven over a row of plants, for shaking the plants and knocking insects such as boll weevil or the like therefrom, into liquid retaining troughs 20 and 21 which are carried by each side of the supporting structure 1 and have their inner facing edges spaced from each other to permit them to pass along a row of cotton plants. The pans or troughs 20 and 21 are supported by suitable bracket arms 22, which are attached to the outer edges of the pan and to longitudinally extending braces 23 which are attached to the vertical braces or posts 2. Guides 24 and 25 are attached to the forward ends of the pans or troughs 20 and 21 respectively and they are provided for properly guiding the cotton plants between the pans.

Aprons 26, which are preferably constructed of foraminous material such as screen wire are attached to the back side 27 the pans 20 and 21 and extend upwardly therefrom, for preventing the weevils from being knocked over the pan.

Any suitable structure as indicated at 30 may be provided for facilitating the propelling of the boll weevil exterminator. The supporting structure 1 has supporting wheels 31 swivelly supported thereby.

In the operation of the improved boll weevil exterminator; the machine is drawn through a field of relatively young cotton plants, so that the pans 20 and 21 will be positioned upon each side of a row of plants. During the movement of the exterminator, the knocker arms 16 and 19 will strike the cotton plants and shake these plants, which will shake the boll weevil from the plants downwardly into the pans or troughs 20 and 21. The pans or troughs 21 are preferably filled with kerosene or any suitable liquid which will kill the boll weevils, as soon as they are knocked into the liquid. The aprons 26 prevent the weevils and other insects from being knocked over the pan. The canvas covering 8 at the rear end of the machine will permit the pan to pass out of the machine, and the edges of the slit in this covering will strike the outermost branches of the plants and shake them, and the flexibility of the canvas will allow the cover to lie close to the plant so as to prevent insects or the like from getting out of the interior of the exterminator. By inclosing the exterminator with the screen 7, winged insects which might be shaken from the cotton plants will be prevented from flying out of the same.

From the foregoing description taken in connection with the accompanying drawings the advantages of construction and of the method of operation of the improved boll weevil exterminator will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a boll weevil exterminator, a supporting structure, a screen mounted about the top, sides and front end of said supporting structure, a liquid retaining pan carried by said supporting structure, means positioned within said supporting structure for knocking insects from plants into said pans, a wire apron attached to the back of said pan and extending upwardly therefrom, a fabric covering mounted over the rear end of said supporting structure and provided with a slit for permitting the cover to pass over plants, and weights attached to the edges of said slit.

2. In a boll weevil exterminator, an inclosed supporting structure, means carried within said supporting structure for shaking plants for shaking insects therefrom, means for receiving the insects carried within said supporting structure, a fabric covering mounted over the rear end of said supporting structure and provided with a slit for permitting the cover to pass over plants, and weights attached to the edges of said slit.

3. In a boll weevil exterminator, a supporting structure, a screen mounted about the top, sides and front end of said supporting structure, a pair of liquid retaining pans carried by said supporting structure and having their inner facing edges spaced for permitting the pans to travel upon opposite sides of a row of plants, and a plurality of resilient knocker bars carried by said supporting structure and projecting inwardly toward the center of the same for striking plants and knocking insects therefrom within said pan, wire aprons attached to the back of said pans and extending upwardly therefrom for preventing the knockers from knocking insects over the pan, a pair of guides attached to the front end of said supporting frame and to said pans for guiding the plants between the pans, a fabric covering mounted over the rear end of said supporting structure, said covering provided with a slit for permitting the cover to pass over plants, and weights attached to the edges of said slit.

In testimony whereof I affix my signature in presence of two witnesses.

JAMES K. STALLINGS.

Witnesses:
B. D. ROWELL,
J. W. MERRILL.